S. R. Bradley,
Manf White Lead.
No. 95,075. Patented Sep. 21. 1869
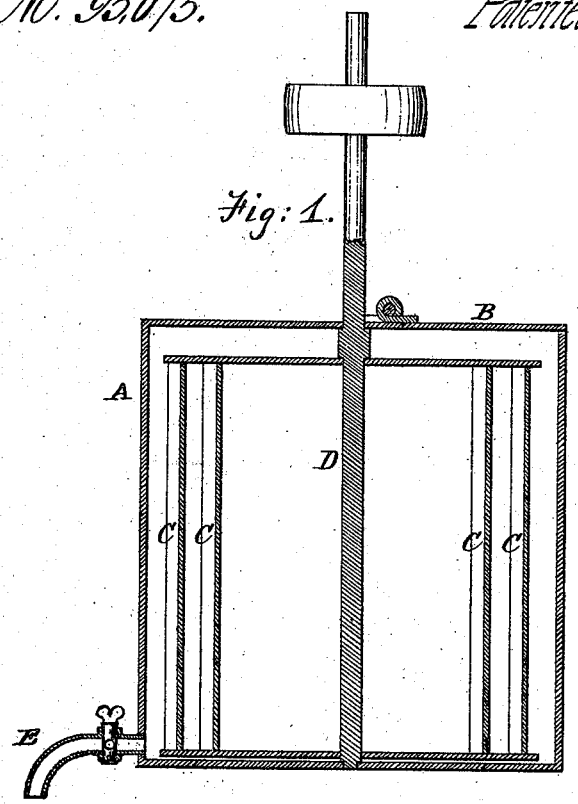
Fig: 1.
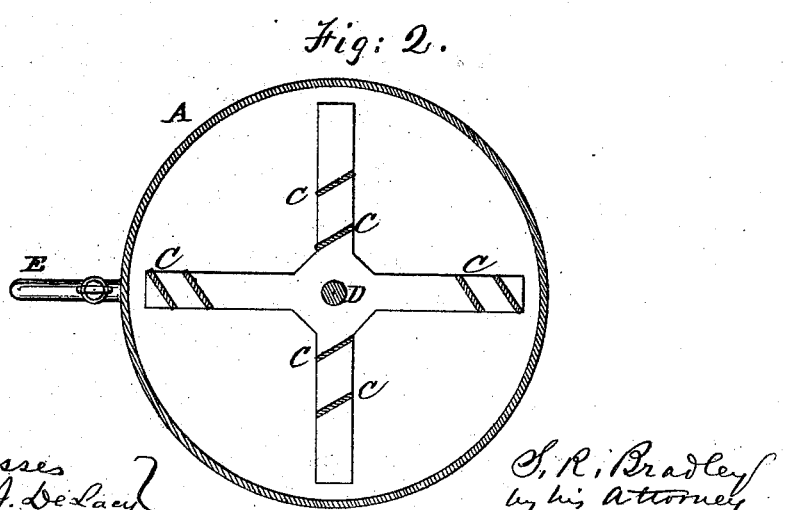
Fig: 2.
Witnesses
Andrew J. DeLacy
W. H. Bishop
S. R. Bradley
by his Attorney
W. W. Kelly

UNITED STATES PATENT OFFICE.

S. R. BRADLEY, OF NEW YORK, N. Y.

IMPROVEMENT IN THE MANUFACTURE OF WHITE LEAD.

Specification forming part of Letters Patent No. 95,075, dated September 2, 1869.

*To all whom it may concern:*

Be it known that I, S. R. BRADLEY, of the city, county, and State of New York, have made a certain new and useful Improvement in the Process of Manufacturing the Pigment known as "White Lead;" and I do hereby declare that the following is a full, clear, and exact description of the same, reference being had to the accompanying drawings, making part of this specification, in which—

Figure 1 is a vertical, and Fig. 2 a horizontal, section of the apparatus which may be used.

It is well known that the carbonate of lead after having been produced is carried through a succession of washings in water, and that when that part of the process is completed it is in admixture with water and in a thick liquid state, termed in the trade, "pulp," and that in that state it is pumped up into large shallow vats and there exposed day and night to a considerable heat to expel all the water by evaporation preparatory to grinding it with oil. On transferring it after it has been dried from the drying-pans to the places where it is mixed with oil the finer particles scatter in the air, exposing the operatives to its deleterious effects.

The object of my invention is to avoid the expense of drying the pulp preparatory to grinding in oil, and at the same time to avoid the deleterious effects due to the moving of the pigment in the state of a dry powder; and to this end my said invention consists in mixing the pulp directly with oil and subjecting the mixture to the action of beaters or stirrers, by means of which a complete admixture of the oil and pigment is effected and the water completely separated, so that it can be drawn off.

The manner in which I have successfully worked my said improved process is as follows, viz: I take the pulp—that is corbonate of lead and water—after the last washing, and while it is in the condition in which it is usually transferred to the drying-pans, and run it into a vessel, A, fitted with a suitable cover, B, and add the required quantity of oil, and there subject it to the beating action of beaters C on arms projecting from a vertical shaft, D, driven by any suitable motor, until it is found by inspection that the pigment and oil have been thoroughly united and the water separated. The rotation of the beaters is then stopped and the whole permitted to rest until the separated water appears of a bluish tint, at which time this water is drawn off through a discharge-pipe, E, at the side into any suitable vessel, and if any of the mixed pigment and oil shall pass into the receiving-vessel it can be there collected by permitting it to settle and drawing off the water; and if the water should be found to contain any material portion of the pigment which has not been taken up by the oil it can be subjected a second time with oil to the action of the beaters and treated as before stated, or it can be subjected to the action of the beaters with a fresh charge of pulp and oil. The pigment so mixed with oil can be packed for use just as it comes from the treatment above described, or it can be run through the mill; and, although I have above described the kind of apparatus in which I have successfully worked my said improved process, I do not wish to be understood as confining myself to the use of such apparatus, as other suitable means may be substituted for the working of my said process, which is based on the discovery that the pigment of the pulp can be separated from the water by the operation of mixing it with the oil.

What I claim as my invention, as an improvement in the manufacture of white lead, (carbonate of lead,) is—

The process, substantially as described, of treating the pulp with oil to effect the separation of the water by the act of combining the oil with the pigment, as set forth.

S. R. BRADLEY.

Witnesses:
WM. H. BISHOP,
WM. F. MCNAMARA.